June 14, 1932.  H. A. WESTRICK  1,863,428
WINDOW SCREEN FOR MOTOR VEHICLES
Filed April 10, 1931
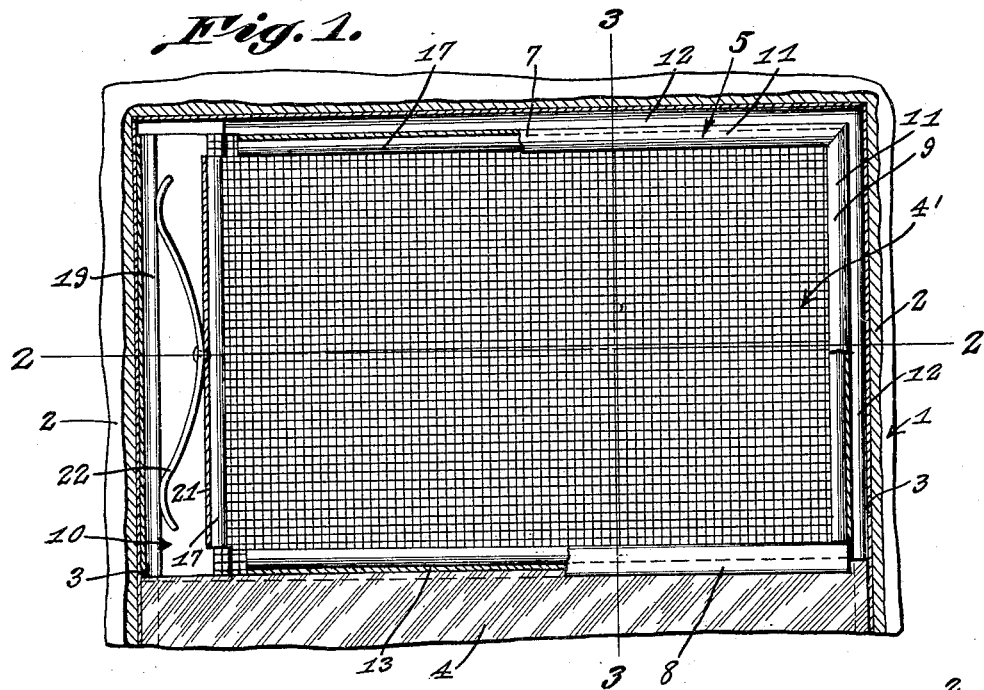
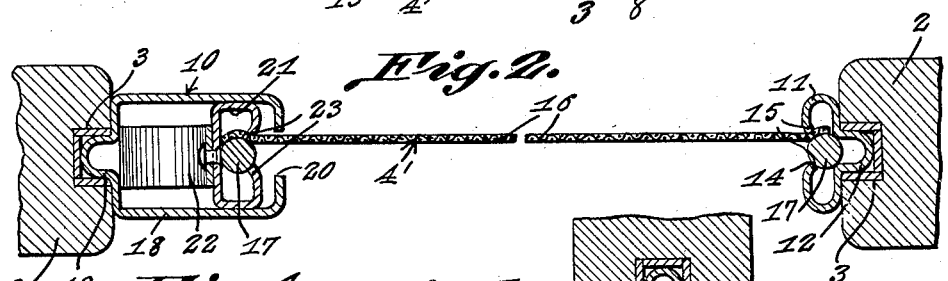
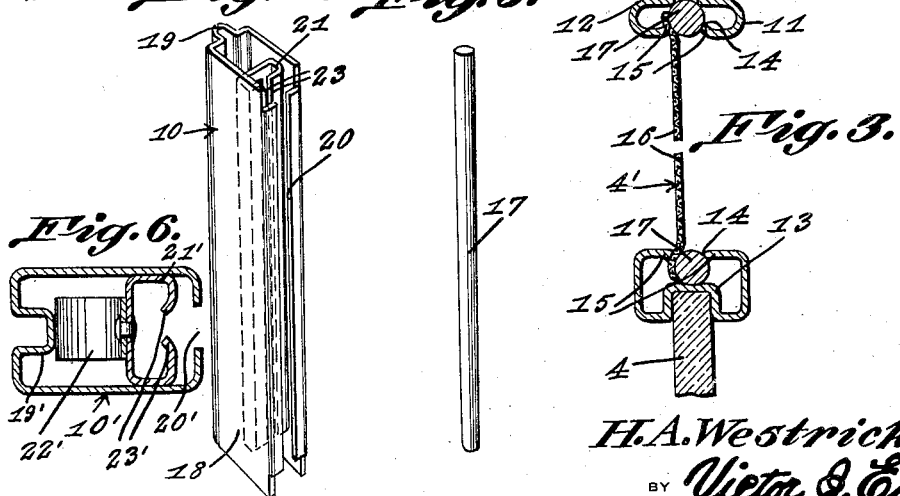
H. A. Westrick, INVENTOR
BY Victor J. Evans and Co.
ATTORNEYS Patented June 14, 1932

1,863,428

UNITED STATES PATENT OFFICE

HARRY A. WESTRICK, OF SALINE, MICHIGAN

WINDOW SCREEN FOR MOTOR VEHICLES

Application filed April 10, 1931. Serial No. 529,187.

This invention relates to window screens for motor vehicles and has for the primary object, the provision of a device of the above stated character which may be easily and quickly installed in a window of a motor vehicle when the glass of said window has been lowered so as to efficiently close the window against the passage of insects and other pests and when the windows of a motor vehicle are equipped with screens of this character the occupants will be protected against the annoyance of insects and still have sufficient ventilation either when the vehicle is in motion or standing still.

Another object of this invention is the provision of a novel frame and means of attaching screen material thereto, so that the device may be applied to the window frame of the motor vehicle and the glass thereof when the latter is in a lowered position whereby the device will be held against accidental displacement but which may be easily removed when desiring to close the window by the window glass.

A further object of this invention is the provision of a window screen for motor vehicles of the above stated character which will be simple, durable and efficient and which may be manufactured and sold at a comparatively low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating a window screen applied to the window of a motor vehicle and constructed in accordance with my invention.

Figure 2 is a sectional view taken on the line 2—2 of Figure 1.

Figure 3 is a sectional view taken on the line 3—3 of Figure 1.

Figure 4 is a perspective view illustrating one of the end members of the window screen frame.

Figure 5 is a perspective view illustrating the wire mesh securing rod.

Figure 6 is a detail sectional view illustrating a modified form of end member of the frame.

Referring in detail to the drawing, the numeral 1 indicates a window frame of a motor vehicle having the side portions 2 thereof provided with the usual guide channels 3 in which the glass 4 is slidably mounted for the purpose of opening and closing the windows. The foregoing description relates to a well known type of window frame employed in motor vehicle construction and to which my invention may be applied.

As shown in Figure 1 the screen 4' is adapted to completely close the window frame when the glass is in a lowered position and includes a frame 5 consisting of upper and lower members 7 and 8 and end members 9 and 10. The upper and end members 7 and 9 are of integral construction and disposed at right angles to each other while the lower member 8 is a separate member from the members 9 and 10 with the ends slidably received within the members 9 and 10. The members 7 and 9 each are constructed from sheet metal bent to form a body 11 and a guide element 12 received within the channels 3. The member 8 is constructed in a similar manner except that a groove 13 is formed in the body instead of the guide element 12 and the groove is adapted to receive the upper edge of the glass 4.

The opposing faces of the bodies of the members 7, 8 and 9 have formed therein slots 14, the walls of which are directed inwardly to form gripping tongues 15. Foraminous material 16 has the edges thereof inserted through the slots 14 and securing rods 17 are inserted through the slots with the material 16 and held therein by the gripping tongues 15 thereby effectively securing the material 16 to said members and provides a construction which will permit the material 16 to be detached therefrom when desiring to renew the same.

The member 10 consists of a body 18 having formed upon one wall a guide element 19 received in one of the end channels 3 of the window frame while the opposite face of the body is provided with a slot 20 to permit the material 16 to extend into the body for engagement with the securing means consisting of a body 21 which has sliding movement within the body 18 and carries a tension member 22 for cushioning and supporting the body 21 within the body 18 of the member 10. The body 21 is provided with a slot, the walls of which are bent inwardly to form resilient gripping tongues 23 and between which the material 16 is positioned and also one of the securing rods 17 which efficiently binds the material 16 against one of the tongues. The body 18 of the member 10 has sliding relation with the members 7 and 8 of the frame and when installing the device in the window frame, the body 18 may be slid against the action of the spring 22 relative to the body 21 and screen material 16 to contract the frame of the screen so that the same may be easily positioned within the window frame, and when properly located the body 18 is released and positioned so that the guide element 19 thereof may fit within the respective groove or channel of the window frame.

The upper and lower members 7 and 8 may be constructed of telescopic sections to permit the screen to be varied as to size.

Referring to Figure 6 which discloses a modified form of my invention, the end member 10' includes a body which has one face offset inwardly to form a channel 19' to receive a guide rod of the window frame should the latter be provided with such a construction. The opposite face of the body is provided with a slot 20' to receive the foraminous material. A body 21' similar in construction to the body 21 is slidably mounted within the body 10' and carries a spring 22' bearing against the offset portion 19'. The body 21' is normally urged in the direction of the slot 20' and is provided with gripping tongues 23' that receive the foraminous material and clamping rod 17.

While I have shown and described the preferred embodiment of my invention, it will be understood that minor changes in construction, combination and arrangement of parts may be made without departing from the spirit and scope of my invention, as claimed.

Having thus described my invention, what I claim is:

A screen for motor vehicle windows comprising a frame including upper, lower and end members, said upper and one of the end members of integral construction, the other end member including movable sections one slidable within the other and one section slidably receiving the upper and lower members, tension means between said sections, said lower member having a groove to receive one edge of a window glass, guide elements formed on the upper and end members and received by the channels of a window frame, said upper and lower members and one of the side members having slots with the walls thereof curved inwardly to provide resilient gripping tongues, said sections of the other end member having aligned slots and the walls of the slot of the inner section curved inwardly to provide resilient gripping tongues, screen material having the edges thereof located in the slots, and rods gripped by said tongues to force the screen material against certain of said tongues.

In testimony whereof I affix my signature.

HARRY A. WESTRICK.